US008423702B2

(12) United States Patent
Scherzer

(10) Patent No.: US 8,423,702 B2
(45) Date of Patent: Apr. 16, 2013

(54) METHOD AND SYSTEM OF CONSERVING BATTERY POWER IN A MOBILE COMPUTER SYSTEM

(75) Inventor: Helmut Scherzer, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1594 days.

(21) Appl. No.: 11/298,158

(22) Filed: Dec. 9, 2005

(65) Prior Publication Data

US 2006/0129757 A1 Jun. 15, 2006

(30) Foreign Application Priority Data

Dec. 14, 2004 (EP) .................................. 04106571

(51) Int. Cl.
*G06F 12/00* (2006.01)
(52) U.S. Cl.
USPC .......................................... 711/103; 711/112
(58) Field of Classification Search ........................ None
See application file for complete search history.

(56) References Cited

U.S. PATENT DOCUMENTS

| 5,491,809 | A | * | 2/1996 | Coffman et al. | ............... | 711/103 |
|---|---|---|---|---|---|---|
| 5,493,670 | A | * | 2/1996 | Douglis et al. | ................ | 713/324 |
| 6,105,141 | A | * | 8/2000 | Hanlon et al. | ................ | 713/323 |
| 6,735,037 | B1 | | 5/2004 | Tanaka et al. | | |
| 2002/0194440 | A1 | * | 12/2002 | Ghosh et al. | .................. | 711/156 |
| 2004/0064647 | A1 | | 4/2004 | DeWhitt et al. | | |
| 2005/0071561 | A1 | * | 3/2005 | Olsen et al. | .................... | 711/118 |
| 2005/0172074 | A1 | * | 8/2005 | Sinclair | ......................... | 711/114 |
| 2006/0080501 | A1 | * | 4/2006 | Auerbach et al. | ............. | 711/112 |

* cited by examiner

*Primary Examiner* — Brian Peugh
(74) *Attorney, Agent, or Firm* — Yudell Isidore Ng Russell PLLC

(57) ABSTRACT

A method, system, and computer-usable medium for operating a mobile computer system. In response to receiving a write request, a control system attempts to write data associated with said write request to a non-volatile memory cache coupled to said hard disk drive. In response to determining the non-volatile memory cache cannot accommodate the data, the control system starts the hard disk drive. The control system writes contents of the non-volatile memory cache to the hard disk drive, after starting the hard disk drive. In response to determining the non-volatile memory cache can accommodate said data, the control system writes the data to the non-volatile memory cache.

12 Claims, 3 Drawing Sheets

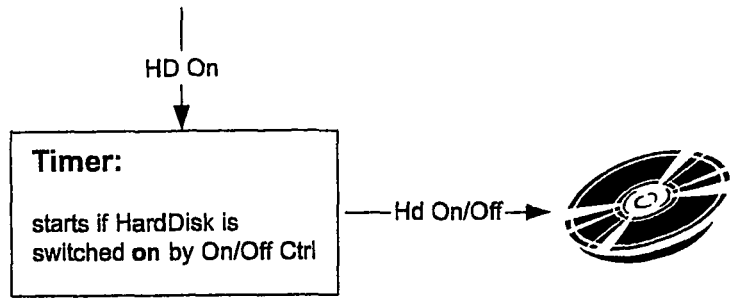

Fig. 5

```
void AccessData(bool  RequestType,
                int   RecordNo,
                char* Data, int& Length)
{
  if (ReadRequest)
  {
    if (RecordInNvmCache(RecordNo, Length)
      ReadRecordNVM(RecordNo, Data, Length)
    else
    {
      StartHardDisk();
      StartHdTimer();
      FlushNVM();
      ReadRecordHardDisk(RecorNo, Data, Length);
    }
    else // WriteRequest
    {
      if (Length > NvmAvail())
      {
        StartHardDisk();
        StartHdTimer();
        FlushNVM();
        WriteRecord(RecordNo, Data, Length);
      }
    }
} void OnTimeout()
{
  StopHardDisk();
}
```

Fig. 6

METHOD AND SYSTEM OF CONSERVING BATTERY POWER IN A MOBILE COMPUTER SYSTEM

PRIORITY CLAIM

This application claims priority of German Patent Application No. DE 04106571.5, filed on Dec. 14, 2004, and entitled, "Mobile computer system and method to operate a mobile computer system".

BACKGROUND OF THE INVENTION

1. Technical Field

The present invention relates to a mobile computer system, especially a notebook or a laptop, which is driven alternatively by an external power supply or by battery, comprising a data processing unit and a hard drive to store data. The present invention relates further to a method to operate a mobile computer system, especially a notebook or a laptop, which is driven by an external power supply or by battery and comprising a data processing unit and a hard drive to store data.

2. Description of the Related Art

Mobile computer systems like laptops or notebooks frequently use hard disks to store data. A common problem with mobile equipment as such is the battery lifetime. The hard disk is one of the essential power sinks, as such quite responsible for the overall duration a mobile computer system like a laptop or a notebook can be used.

Several techniques have been successfully employed to optimize the power consumption on laptops. A general idea consists of stopping the hard disk after a specified time from 3 to 60 minutes. This time is typically user selectable because it depends on the user behavior. A large time has to be paid with less usage time, a very short time (e.g. 10 seconds) would have to be paid with low performance as in several programs with hard disk access the hard disk would have to restart (additional power consumption) very often.

As a matter of fact this approach is far from optimum because as a common habit, a user should save his/her work on a document about every 5 minutes—which is quite usual in the professional world. As non-professional users are not familiar with this 'saving' attitude, modern programs have invented automatic document backups that perform this 'save' task automatically in a specified time frame. This automatism would, however, start the hard disk about every 3-10 minutes depending on the setting.

Summarizing it can be said that the 'shutdown' of a hard disk in mobile computers is currently the best state of the art available technology to reduce the power consumption of a hard disk, however it is far from optimal because the shutdown cycle does not cover the demands of applications requirements.

SUMMARY OF THE INVENTION

The present invention provides a new mobile computer system, especially a notebook or a laptop, which is driven alternatively by an external power supply or by battery, comprising a data processing unit and a hard drive to store data.

The new mobile computer system is characterized in that a non-volatile memory means is superimposed to the hard drive. The present invention uses a non-volatile memory means in order to virtually replace the hard drive for a certain amount of data.

A preferred embodiment of the system is characterized in that the non-volatile memory means is attached to the hard drive to cache the access and shield the hard drive from spinning until information cannot be found in the non-volatile memory means (read) or needs to be written to the hard drive since the non-volatile memory means is full. This takes into account the fact, that data should not be lost when switching off power. Typically the hard drive does guarantee this. The present invention however, proposes to have the non-volatile memory means on top of this in order to prevent the hard drive from access.

A further preferred embodiment of the system is characterized in that a stream controller cooperates with the data processing unit to route all read/write access from the data processing unit to the hard drive through the non-volatile memory means. The addressing of the hard drive is done in terms of sectors, cylinders or blocks. The stream controller has evidence of the records and their size kept in the non-volatile memory means. If the non-volatile memory means overruns, the stream controller starts the hard drive, flushes the content of the non-volatile memory means to the assigned records, which have been stored in the non-volatile memory means together with the actual information.

The present invention provides a new method to operate a mobile computer system, especially a notebook or a laptop, which is driven by an external power supply or by battery and comprising a data processing unit and a hard drive to store data.

The new method is characterized in that the access to the hard drive is cached by a non-volatile memory means when the mobile computer system is driven by battery. The non-volatile memory means is used to shield the hard drive and to prevent the hard drive from access when the mobile computer system is driven by battery. When the mobile computer system is driven by an external power supply the hard drive may be accessed directly.

A preferred embodiment of the method is characterized in that all read/write access to the hard drive is routed through the non-volatile memory means and processed such that data might be retrieved from and stored in the non-volatile memory means in order to prevent the hard drive from access. The advantages of the inventive method are that the hard drive does not need to be accessed if the appropriate information is available in the non-volatile memory means. Since the non-volatile memory means can reach affordable dimensions of 1 GB by today's technology, there seems to be plenty of resources available such that the propose effect of saving power in mobile computer system is very likely to happen.

A further preferred embodiment of the method is characterized in that the non-volatile memory means is enabled when the mobile computer system is driven by battery and disabled when the mobile computer system is driven by the external power supply. If the mobile computer system is connected to external power, the non-volatile memory means is not needed since there is no issue of power saving. Access to the hard drive will be faster since it is not routed through the non-volatile memory means.

A further preferred embodiment of the method is characterized in that the non-volatile memory means is disabled if it is expected that an application will stream large amount of data on/from the hard drive. The non-volatile memory means may be disabled in order to optimize performance. This can be done through an operating system, e.g. if it is known that an application will stream large amount of data on/from the hard drive (e.g. a data acquisition running all night).

A further preferred embodiment of the method is characterized in that whenever the hard drive needs to be started, a timer is started that keeps the hard drive on until a specified timeout is exceeded. The timeout is exceeded after a maximum time period of several minutes. This avoids starting the hard drive inappropriately often. Whenever the timer is started, the non-volatile memory (NVM) cache is flushed to the hard drive. That does not necessarily imply the deletion of the non-volatile memory means storage which could still hold the content to be read. However, when data is written then the data in the non-volatile memory means storage might be overwritten by that time, i.e. a flushed non-volatile memory will offer its full size for writing new data, but unless new data is not written into non-volatile memory means, the old content can still be accessed for read.

The present invention relates further to a computer program product stored in the internal memory of a digital computer, containing parts of software code to execute the above described method.

The above-mentioned features, as well as additional objectives, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 5 is a block diagram illustrating an exemplary hard drive on/off control according to a preferred embodiment of the present invention; and FIG. 6 depicts pseudocode for implementing an exemplary method of controlling a non-volatile memory cache according to a preferred embodiment of the present invention.

DETAILED DESCRIPTION OF A PREFERRED EMBODIMENT

The present invention proposes to attach a non-volatile-memory (NVM) cache to an existing hard drive. The hard drive is also called hard disk. The hard drive may comprise a hard disk.

Figure 1:
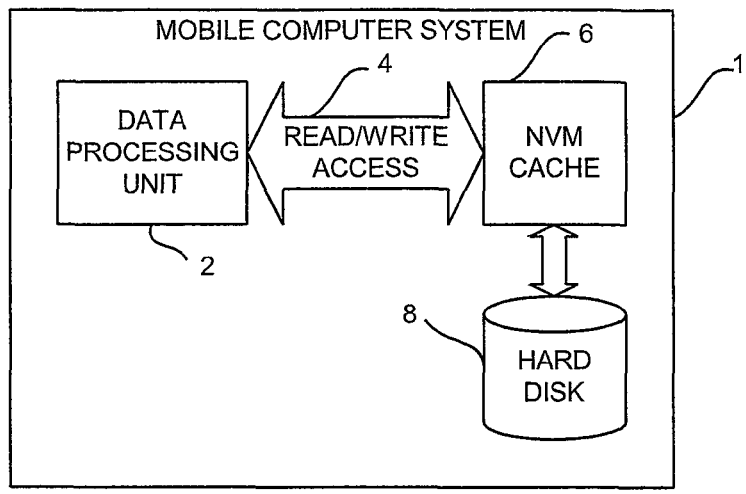
FIG. 1 illustrates a block diagram of a preferred embodiment of a mobile computer system including a non-volatile memory cache according to a preferred embodiment of the present invention.

FIG. 1 shows a scheme of mobile computer system 1 with a data processing unit 2. The data processing unit 2 has read/write access 4 to a non-volatile-memory (NVM) cache 6. Non-volatile-memory cache 6 caches a hard disk 8.

All read/write access 4 to hard disk 8 will be routed through the NVM-cache 6. This is realized through classical cache algorithms which are state of the art. The major difference to the present state of the art technology however, is the use of non-volatile memory for the caching.

This takes into account the fact, that data should not be lost when switching off power. Typically the hard disk does guarantee this. The present invention however, proposes to have another memory type on top of this in order to prevent the hard disk from access. Since NVM memory cannot be written as fast as a RAM-cached hard drive the present invention proposes in addition to the core idea of using NVM-cache to combine the two cache types.

Figure 2:
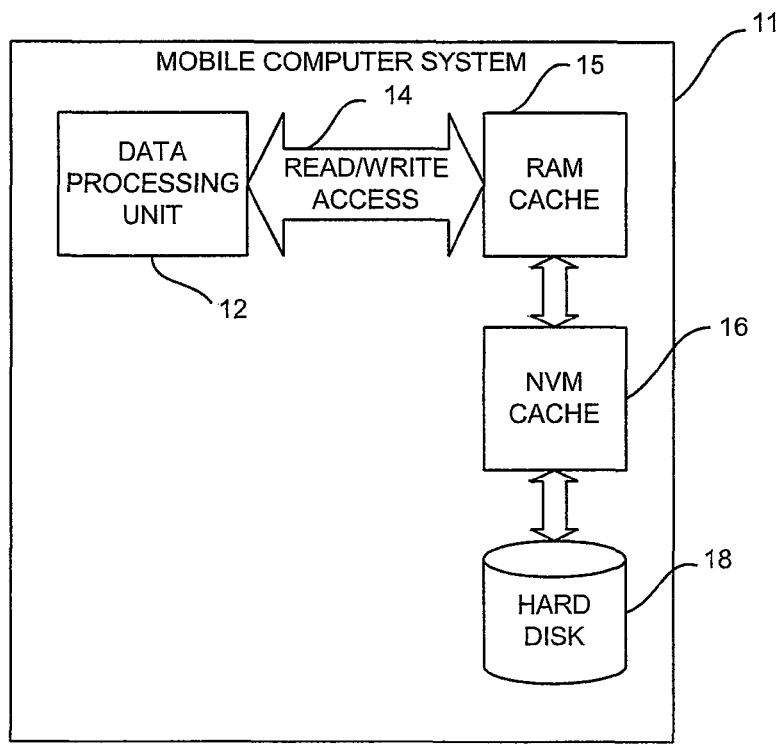
FIG. 2 depicts a block diagram of another preferred embodiment of a mobile computer system including a non-volatile memory cache according to a preferred embodiment of the present invention.

FIG. 2 shows a scheme of mobile computer system 11 with a data processing unit 12. The data processing unit 12 has read/write access 14 to a volatile random access memory (RAM) cache 15. RAM cache 15 caches a non-volatile-memory (NVM) cache 16. Non-volatile-memory cache 16 caches a hard disk 18. The combination of RAM cache 15 with NVM memory 16 allows using RAM cache 15 for performance optimizations in the classical sense.

The introduction of the NVM cache 6; 16 however allows to shield the hard disk 8; 18 from access until information on the NVM cache 6; 16 is not available (read situation) or must be written to the hard drive 8; 18 because the non-volatile memory 6; 16 needs to be flushed. A 'needs flush' situation occurs either if the NVM cache 1; 16 is full or due to some initiated action e.g. a system shutdown.

The advantages of the NVM cache are, that a hard disk does not need to be accessed if the appropriate information is available in the cache. Since the NVM cache can reach affordable dimensions of 1 GB by today's technology, there seems to be plenty of resources available such that the propose effect of saving power in mobile equipment is very likely to happen.

The idea of the present invention is significantly different from the idea of using non-volatile memory as a replacement for a hard disk. The implementation and layout of a machine according to FIGS. 1 and 2 does mandate the existence of a hard disk whereas the 'replacement' idea does avoid the existence of a hard disk (HD) by definition.

Typical access to the proposed system can be described as follows.

Read Access:
1. Is searched data in RAM cache?
   Yes: read from RAM; No: go to step 2
2. Is searched data in NVM cache?
   Yes: read from NVM; No: go to step 3
3. Start hard disk (if idle); Read Data from hard disk
4. Stop hard disk after specified time (can be shorter than 3 minutes since the NVM cache would cover the problem of restart)

Write Access:
1. Is record to be committed?
   Yes: Write to RAM(2), Flush RAM to NVM(5); No: Write to RAM
2. WriteToRam: Is space enough in RAM?
   Yes: write to RAM; No: goto Step 3 (Write to NVM)
3. WriteToNVM: Is space enough in NVM?
   Yes: write to NVM; No: goto step 4 (Write to HD)
4. WriteToHD: Start hard disk; Flush NVM to hard disk, Flush RAM to hard disk
5. FlushRam: goto Step 3 using RAM, clear RAM The above steps are a rough scheme to prove the feasibility of the proposed system. The larger the capacity of the NVM is, the longer the hard drive does not require to be accessed and as a consequence can remain idle.

The major advantage of this system comes from saving the power to supply the hard disk. With this approach a significant performance improvement regarding battery life time can be achieved in mobile equipment.

The implementation of the non-volatile-memory (NVM) that is also called Flash-Cache can be made in two flavors. The Flash-Cache may be located on the hard disk or external to the hard disk.

Figure 3:
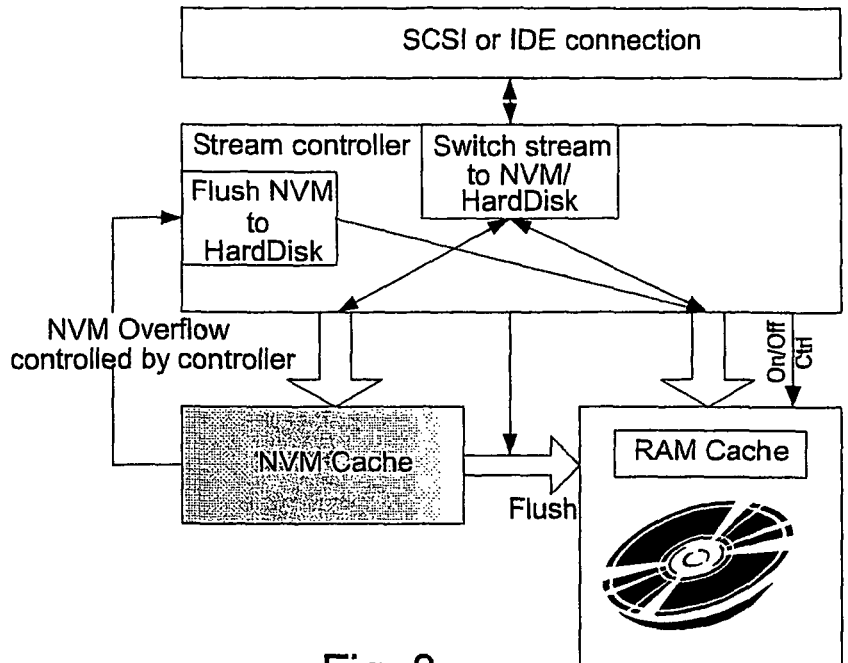
FIG. 3 illustrates a block diagram of an exemplary non-volatile memory/hard disk drive switching mechanism according to a preferred embodiment of the present invention.

FIG. 3 shows a scheme of a Flash-Cache on hard disk implementation. The non volatile memory is located on the hard disk. The addressing of the hard disk is done in terms of sectors, cylinders or blocks. A Stream controller has evidence of the records and their size kept in the NVM cache. If the NVM cache overruns, the stream controller starts the hard disk, flushes the content of NVM to the assigned records, which have been stored in the NVM Cache together with the actual information.

Then there might be a specified timeout until when the Stream control might switch the hard drive. If NVM may store the incoming information or data is requested that is stored in the NVM Cache, the Stream controller can read and write to the NVM Cache until overflow with out having the hard drive to be involved. This is in particular relevant for a scenario where a file is edited and saved for data loss prevention reasons several times within the session. On/Off control for the hard disk is also done by the stream controller.

Figure 4:
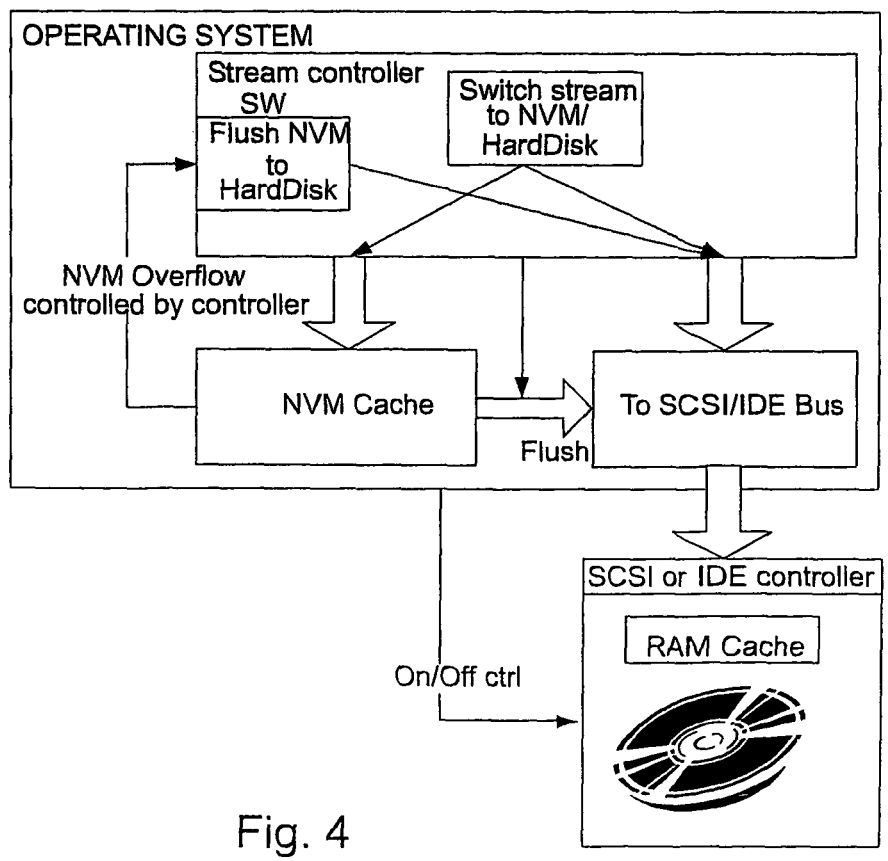
FIG. 4 is a block diagram depicting an exemplary method of controlling non-volatile memory cache overflows according to a preferred embodiment of the present invention.

Logically the same mechanism applies as described in the previous chapter if the Flash Cache is located external to the hard drive as shown in FIG. 4. However, operating system support may increase the efficiency of the NVM Cache approch. Since an operating system 'knows' more about the data to be stored (e.g. whether it belongs to one or another file) it might optimize the decision where to put data.

For instance an operating system might know the amount of data to be written before writing the actual data. If then an operating system knows that the data to be written is anyway larger than the NVM Cache size, it can decide to use the hard disk right away instead of going through the NVM Cache.

FIG. 5 shows a scheme of an On/Off control (Ctrl) of a hard disk. The On/Off Ctrl for the spin of the hard disk should be made 'intelligent' enough to cover the typical scenarios. If the hard disk is started once for flush or 'record not in NVM' reasons, then a timer is suggested that keeps the hard disk on until a specified timeout (max. of several minutes) is exceeded. This avoids starting the hard disk inappropriately often.

The NVM Cache feature may be disabled in order optimized performance. This can be done through the operating system, e.g. if it is known that an application will stream large amount of data on/from the disk (e.g. a data acquisition running all night).

Another choice is the automatic de-/activation of the NVM Cache by the evidence of external power. If the mobile device is connected to external power, the NVM Cache is not needed since there is no issue of power saving. Access to the hard disk will be faster since it is not routed through the NVM cache. When the operating system boots, NVM-Cache should not be involved since the location and amount of data will probably not match with the contents of the NVM Cache.

FIG. 6 shows a basic algorithm to control the use of the NVM Cache together with a hard disk. It can be seen that whenever the hard disk needs to be started, the timer is started and the NVM cache is flushed to the hard disk. That does not necessarily imply the deletion of the NVM storage which could still hold the content to be read. However, when data is written then the data in the NVM storage might be overwritten by that time, i.e. a flushed NVM will offer its full size for writing new data, but unless new data is not written into NVM, the old content can still be accessed for read.

Also, it should be understood that at least some aspects of the present invention may be alternatively implemented in a computer-readable medium that stores a program product. Programs defining functions on the present invention can be delivered to a data storage system or a computer system via a variety of signal-bearing media, which include, without limitation, non-writable storage media (e.g., CD-ROM), writable storage media (e.g., floppy diskette, hard disk drive, read/write CD-ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
in response to a computing system operating on battery power, and in response to a write command being directed to a hard disk that is associated with said computing system, writing a new data, said new data being directed by said write command to be written on said hard disk, to a non-volatile memory that is associated with said hard disk; and,
in response to said computing system being coupled to an external power supply, moving old data stored in said non-volatile memory to said hard disk and disabling said non-volatile memory.

2. The method according to claim 1, further comprising:
in response to a determination that said non-volatile memory cannot accommodate said writing of said new data, moving old data stored in said non-volatile memory to said hard disk; and
subsequently writing said new data to said non-volatile memory.

3. The method according to claim 2, further comprising:
placing said hard disk into an idle state after a predetermined amount of time after said moving old data.

4. The method according to claim 1, further comprising:
in response to a read command being directed to said hard disk, searching said non-volatile memory for data requested by said read command; and
in response to determining said data requested by said read request is not stored in said non-volatile memory, reading said data requested by said read request from said hard disk.

5. A computing system comprising:
at least one processor;
a hard disk, coupled to said at least one processor via an interconnect;
a non-volatile memory, coupled to said hard disk; and
a control system, coupled to said interconnect, wherein said control system includes a computer-usable medium embodying computer program code, said computer program code comprising instructions executable by said control system and configured to:
in response to said computing system operating on battery power, and in response to a write command being directed to said hard disk that is associated with said computing system, writing a new data, said new data being directed by said write command to be written on said hard disk, to said non-volatile memory; and, in response to said computing system being coupled to an external power supply, moving old data stored in said non-volatile memory to said hard disk and disabling said non-volatile memory.

6. The computing system according to claim 5, wherein said instructions further comprise:

in response to a determination that said non-volatile memory cannot accommodate said writing of said new data, moving old data stored in said non-volatile memory to said hard disk; and subsequently writing said new data to said non-volatile memory.

7. The computing system according to claim 6, wherein said instructions further comprise:

placing said hard disk into an idle state after a predetermined amount of time after said moving old data.

8. The computing system according to claim 5, wherein said instructions further comprise:

in response to a read command being directed to said hard disk, searching said non-volatile memory for data requested by said read command; and in response to determining said data requested by said read request is not stored in said non-volatile memory, reading said data requested by said read request from said hard disk.

9. A non-transitory computer-usable medium embodying computer program code, said computer program code comprising computer executable instructions configured to:

in response to a computing system operating on battery power, and in response to a write command being directed to a hard disk that is associated with said computing system, writing a new data, said new data being directed by said write command to be written on said hard disk, to a non-volatile memory that is associated with said hard disk; and, in response to said computing system being coupled to an external power supply, moving old data stored in said non-volatile memory to said hard disk and disabling said non-volatile memory.

10. The computer-usable medium according to claim 9, wherein said embodied computer program code further comprises computer executable instructions configured to:

in response to a determination that said non-volatile memory cannot accommodate said writing of said new data, moving old data stored in said non-volatile memory to said hard disk; and subsequently writing said new data to said non-volatile memory.

11. The computer-usable medium according to claim 10, wherein said embodied computer program code further comprises computer executable instructions configured to:

placing said hard disk into an idle state after a predetermined amount of time after said moving old data.

12. The computer-usable medium according to claim 9, wherein said embodied computer program code further comprises computer executable instructions configured to:

in response to a read command being directed to said hard disk, searching said non-volatile memory for data requested by said read command; and in response to determining said data requested by said read request is not stored in said non-volatile memory, reading said data requested by said read request from said hard disk.

* * * * *